July 28, 1964 T. S. CALHOUN 3,142,170

CONTROL APPARATUS

Filed Dec. 1, 1960

INVENTOR.
THOMAS S. CALHOUN

BY [signature]

ATTORNEY

United States Patent Office 3,142,170
Patented July 28, 1964

3,142,170

CONTROL APPARATUS

Thomas S. Calhoun, Hopkins, Minn., assignor to Minneapolis-Honeywell Regulator Company, Minneapolis, Minn., a corporation of Delaware Filed Dec. 1, 1960, Ser. No. 73,087
1 Claim. (Cl. 73—15)

This invention relates to a system giving an indication of the cooling ability of the air and also operates to give a warning signal when the cooling ability of the air falls below a predetermined level or to deenergize equipment which could be damaged by continued operation under an environment which would not supply sufficient cooling to this equipment. The invention also relates to a transistor amplifier means using a thermal transfer of energy to close the feedback loop to the amplifier means, used as part of the above mentioned system.

Prior art such as the coolometer of Weeks 2,016,660 provides an indication of the cooling ability of the air but no warning when the cooling ability becomes less than a given amount. Also, the coolometer indication is such that mathematical calculations are required to determine the cooling ability of the air.

Other systems such as measuring the air temperature and mass flow rate and combining these values by computer techniques have also been used but these systems tend to be unduly complicated and are not usable in limited space applications quite often found in today's space age electronics.

The present invention comprises a system having a sensing element heated to a constant temperature under the control of an amplifier means characterized by using thermal transfer of energy to complete the feedback loop to the amplifier means. An adjustment is provided to obtain a warning signal output at any desired cooling ability point. An indicator is also included to give an idea of the cooling ability safety factor available before the equipment will be harmed. The amplifier is a high gain transistor amplifier to give high sensitivity. Tight accuracy tolerances can thus be obtained. The heating element is in a feedback relation to the system so that, under low air flow, high ambient temperature conditions, the amount of heating to the sensing element will be very low and will not harm the sensing element. A flip-flop or switching circuit is attached to the output of the amplifier to operate a relay which will either control a warning light or control the power to the equipment being cooled so that the equipment will be turned off when the environment is harmful to its operation.

An object of this invention is to provide a system which will give a warning when the cooling ability of the environment has fallen below a certain predetermined level.

Another object of this invention is to provide a system which will give an indication of the amount of reserve cooling ability of the environment before harmful effects to the equipment will occur.

Figure 1:
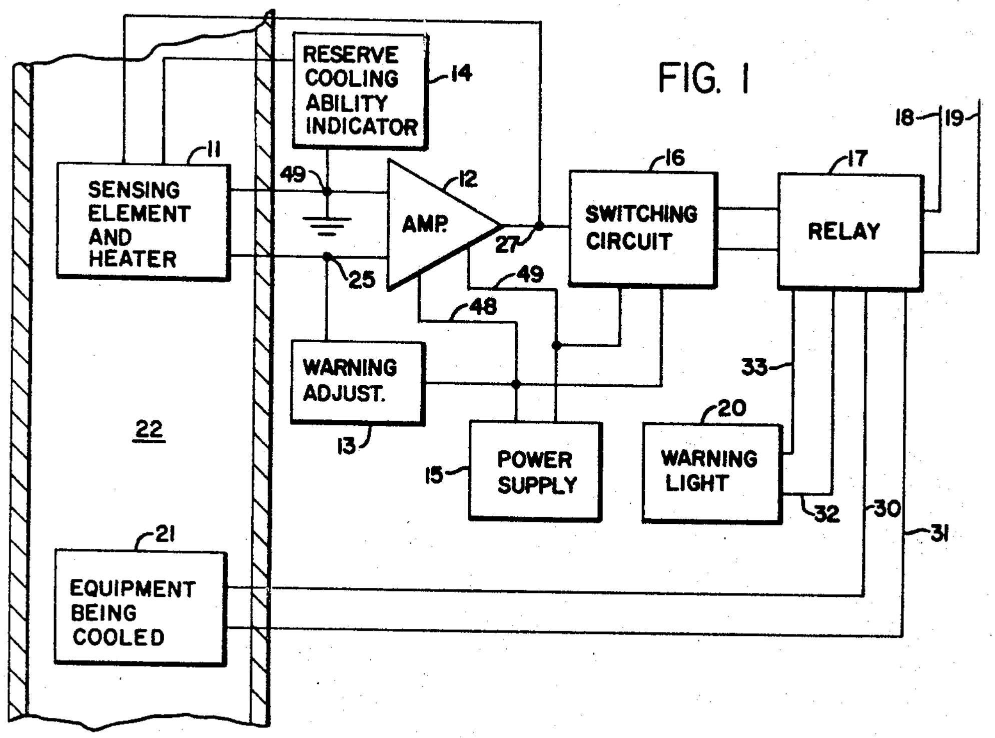
Figure 2:
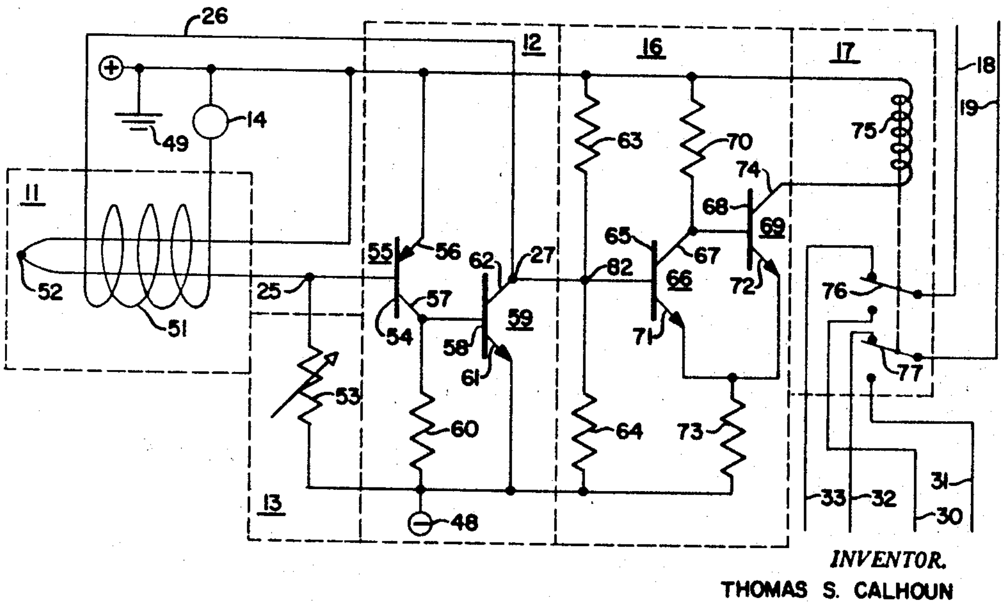

Other objects and features of this invention will appear to those skilled in the art as the specification and appended claims are read, and in conjunction with the accompanying drawing of which:

FIGURE 1 is a block diagram of the complete system described in this invention; and FIGURE 2 is a schematic diagram of the circuit and associated components required to operate this system.

In FIGURE 1, a block indicating the combination of a sensing element and heater 11 is shown connected to an amplifier 12, a warning adjustment or cooling ability adjustment 13, and a reserve cooling ability indicator 14. A power supply 15 supplies current to the various blocks utilizing direct current power. The output of the amplifier 12 is supplied to a heating element in block 11 and also to a Schmitt trigger, switching circuit, gating means, or voltage sensitive switch 16 which controls a relay 17. The relay 17 controls the current coming into the relay through wires 18 and 19 and is connected to a warning light 20 and also to equipment being cooled, generally designated as 21. The warning light can either be a safety light which goes off when the environment is unsafe or, as is shown in the preferred embodiment, the relay 17 can be of double pole, double throw construction to turn on the power to the warning light 20 when it turns off the power to the equipment being cooled 21. The wires 30 and 31 connect the relay 17 to the equipment being cooled 21 and wires 32 and 33 connect relay 17 to the warning light 20. The combination of the sensing element and the heater 11 and also the equipment being cooled 21 are in a space generally designated as 22. The space 22 can be completely separated from the rest of the equipment or it could all be in one general area.

FIGURE 2 shows a milliammeter or reserve cooling ability indicator 14 calibrated in units such as B.t.u., to give an indication of the cooling ability left in the environment. This indicator 14 is connected between the ground point or suitable positive terminal point 49 on a power supply, such as 15 mentioned above, and a heating element 51. A thermistor or temperature responsive element 52 is heated by the heating element 51. This thermistor 52 is connected between ground 49 and a ressistance element 53 here shown as a variable resistor. The other end of the resistance element 53 is connected to a second terminal 48 of the power supply 15, which in this case is a negative voltage terminal and is below ground potential. The terminal 48 does not have to be negative with respect to ground. The only requirement is the proper operation of the circuit and with this particular transistor circuit, the terminal 48, although required to be more negative than terminal 49, could be grounded and terminal 49 would then be a positive voltage with reference to ground. Terminals 48 and 49 could also be below and above ground respectively in some applications. If other transistor types are used in the design of this type of circuit, the polarity of the voltage applied to the resistor 53 could very well change. A junction 25 between the variable resistance element 53 and the thermistor 52 is connected to a base terminal 54 on a PNP transistor 55. An emitter 56 on the transistor 55 is also connected to the ground terminal 49 of the power supply 15. A collector terminal 57 on transistor 55 is connected to a base terminal 58 on an NPN transistor 59 and also to a resistance element 60. The other terminal of resistance element 60 is connected to the negative terminal 48 of the power supply 15. An emitter terminal 61 on transistor 59 is also connected to the negative terminal 48 of the power supply 15. A collector terminal 62 on the transistor 59 is connected at a junction point 27 to the heating element 51 by wire 26 and also to a junction point 82 between two resistors 63 and 64 and from there to a base terminal 65 on an NPN transistor or gating means 66. The other terminals of the fixed resistance elements 63 and 64 are connected to ground 49 and to the negative terminal 48 respectively on the power supply 15. A collector terminal 67 on the transistor 66 is connected to a base terminal 68 on an NPN transistor or gating means 69 and also to a resistance element 70 which is connected on the other end to the ground terminal 49. An emitter terminal 71 on transistor 66 is connected to an emitter terminal 72 on transistor 69 and also to a fixed resistance element 73. Resistance element 73 is connected on the other terminal to the negative terminal 48 on the power supply 15. A collector terminal 74 on transistor 69 is connected to a relay coil 75 on relay 17. The relay coil is connected on the other end of the winding to ground point 49. The relay coil 75 controls the movable contacts 76 and 77 to the supply wires 18 and 19 which supply power through the wires 32 and 33 to a warning light and through wires 30 and 31 to the equipment being cooled shown in FIGURE 1 as blocks 20 and 21 to illustrate the operation of the circuit.

Assume that the cooling air moving past the thermistor 52 is lowered in temperature or increased in velocity to increase the cooling ability of the air. When the sensor 52 becomes cooler there is an increase in its resistance and the junction point 25 shifts to a lower potential or nearer to that of terminal 48, because of the voltage divider action of the two elements 52 and 53. With the voltage at the base terminal 54 at a lower potential the transistor 55 will conduct more current and will therefore raise the voltage on the collector terminal 57 toward ground and as a result raise the voltage on the base terminal 58 of the transistor 59. As the base 58 on transistor 59 becomes closer to ground potential the transistor 59 will conduct more current. The conduction of a greater amount of current through the transistor 59 also results in an increase in current through the heating element 51 and the meter 14. The increase in current through the meter 14 will give an indication of the increase in cooling ability of the air. The increased current through the heating element 51 will produce more heat to get the temperature of the sensing element 52 back to a predetermined value. This predetermined point at which the temperature of the sensing element 52 is maintained is determined by the adjustment of the variable resistance element 53 which is shown in FIGURE 1 as the warning adjustment 13. The purpose of the variable resistance 53 however, is not to primarily vary the temperature at which the sensing element 52 is maintained, but rather to vary the point at which the relay 75 will be deenergized.

As the air or other cooling fluid heats up or the cooling ability of the air becomes less, the resistance of the sensing element 52 becomes less and the voltage divider action of 52 and 53 in combination raises the voltage at junction point 25 or changes it towards ground 49 to reduce the current through the transistor 55 and thereby reduce the current through transistor 59. As the current through transistor 59 is lowered, the voltage of the collector 62 changes to a point closer to ground and thus reduces the current through the heating coil 51 and the indicator 14.

As the base 65 on transistor 66 is moved beyond a certain point in the direction of ground, due to the current change in transistor 59, the voltage on base 65 becomes sufficiently greater than the voltage at the emitter 71 to turn on the transistor 66 and allow current to flow through this transistor. When the transistor 66 changes from a non-conducting to conducting state the resistance from collector terminal 67 to emitter terminal 71 is so low that the current flows through transistor 66 instead of through the base terminal 68 to the emitter 72 of transistor 69. This change of current flow changes the transistor 69 from a state of full conduction to an off state or a state of substantially no conduction of current. With the transistor 69 in a non-conducting state the relay 75 releases the contacts 76 and 77 to open the circuit to the equipment that is being cooled and monitored by this invention.

As a brief review of the circuit, it can be seen that the variable resistance element 53 can be adjusted in resistance to change the temperature at which the heating element 51 maintains the sensing element 52. This in turn changes the amount of current through the cooling ability indicator 14 and the heating element 51 to change the point at which the flip-flop circuit, composed of transistors 66 and 69, deenergizes the relay.

The corresponding parts which make up a block are sectioned off by dashed lines in FIGURE 2 and given the same number in each section as the block in FIGURE 1 with the exception of meter 14 which has the same number as its corresponding part in FIGURE 2 but is not sectioned off with dotted lines.

It should be understood of course that the Schmitt trigger 16 is not essential. An amplifier can be constructed such that the relay 17 is operated directly from the amplifier 12. Also, the relay 17 may not be needed if alternating current equipment is not being controlled. Where only a warning light or a warning device of this type is being controlled, the light can be placed in the output of the switching or flip-flop circuit 16.

While I have shown and described a preferred embodiment of this invention, further modifications and improvements will occur to those skilled in the art. I desire it to be understood, therefore, that this invention is not limited to the particular form shown and described and I intend in the appended claims to cover all modifications which do not depart from the spirit and scope of this invention.

What I claim is:

An environment sensitive indicator comprising, in combination: sensing means which varies in resistance as a function of temperature; an adjustable resistance means; a first transistor; a second transistor; each of said transistors including a base, a collector and an emitter; a power source comprising first and second terminal means; and means connecting a first terminal of said sensing means to said first terminal; means connecting a first terminal of said adjustable resistance means to said second terminal of said power source; means connecting said base of said first transistor to a second terminal of both said adjustable resistance means and of said sensing means; a first fixed resistance means; means connecting said emitter of said first transistor to said first terminal means; means connecting said collector of said first transistor to said base of said second transistor; means connecting said base of said second transistor to said second terminal means through said first fixed resistance means; means connecting said emitter of said second transistor to said second terminal means; a heating element means; an indicating means; means connecting said collector of said second transistor to said first terminal means through said heating element means and said indicating means; means for positioning said sensing means and said heating element means in good thermal relationship, the heating element being held at a substantially constant temperature through a feedback path utilizing this good thermal relationship; and gating means connected to said collector of said second transistor means, said gating means operating when a predetermined ratio of resistance is attained between said sensing means and said adjustable resistance means.

References Cited in the file of this patent

UNITED STATES PATENTS

| | | |
|---|---|---|
| 2,016,660 | Weeks | Oct. 8, 1935 |
| 2,105,430 | Metcalf | Jan. 11, 1938 |
| 2,580,782 | Hoffman et al. | Jan. 1, 1952 |
| 2,583,561 | General et al. | Jan. 29, 1952 |
| 2,892,347 | Laprand | June 30, 1959 |
| 2,922,304 | Lees et al. | Jan. 26, 1960 |